United States Patent
Arness et al.

(10) Patent No.: US 6,717,095 B2
(45) Date of Patent: Apr. 6, 2004

(54) COOLANT SIDE SURFACE ROUGHNESS ON AIRFOIL CASTINGS BY ELECTRICAL DISCHARGE MACHINING (EDM)

(75) Inventors: Brian Peter Arness, Simpsonville, SC (US); James Michael Placko, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/124,311

(22) Filed: Apr. 18, 2002

(65) Prior Publication Data

US 2003/0196990 A1 Oct. 23, 2003

(51) Int. Cl.$^7$ ............................... B23H 1/00; B23H 9/10
(52) U.S. Cl. .................................. 219/69.17; 219/69.15
(58) Field of Search .................... 219/69.12, 69.17, 219/69.15; 29/889.72, 889.721; 204/224 M

(56) References Cited

U.S. PATENT DOCUMENTS

| | | | | |
|---|---|---|---|---|
| 3,663,785 A | * | 5/1972 | Hausermann | 219/69.17 |
| 6,383,658 B1 | * | 5/2002 | Carlson et al. | |
| 6,388,223 B2 | * | 5/2002 | Jones et al. | 219/69.17 |

FOREIGN PATENT DOCUMENTS

| | | | |
|---|---|---|---|
| JP | 11-131224 A | * | 5/1999 |
| RU | 2020070 C1 | * | 9/1994 |

* cited by examiner

*Primary Examiner*—Geoffrey S. Evans
(74) *Attorney, Agent, or Firm*—Nixon & Vanderhye PC

(57) ABSTRACT

The present invention involves a process for increasing coolant side surface roughness on castings such as airfoils, shrouds, nozzles or the like by electrical discharge machining (EDM). An EDM electrode is shaped to fill completely or a portion of a cavity in the casting, the electrode is then connected to an electric discharge machine, and the internal surfaces of the internal core cavity are then machined to form a roughened surface.

7 Claims, 3 Drawing Sheets

COOLANT SIDE SURFACE ROUGHNESS ON AIRFOIL CASTINGS BY ELECTRICAL DISCHARGE MACHINING (EDM)

BACKGROUND AND SUMMARY OF THE INVENTION

The invention relates to a method for increasing the coolant side surface roughness on castings by electrical discharge machining (EDM). More particularly the invention is directed to a method for increasing the coolant side surface roughness on interior cavity surfaces of airfoil castings by using EDM.

As is well known to those skilled in the art gas turbine airfoils operate in an extremely hot environment. In order to meet the life requirements of the machines, compressor discharge air is circulated through the airfoils to cool them. However, bleeding air from the compressor lowers the overall turbine efficiency. Therefore, engineers have been challenged by the life requirements of the airfoil and the need to minimize the use of cooling air.

Recent developments in heat transfer technology have shown that through wall heat fluxes can be improved by increasing the surface roughness of the coolant side wall, thereby reducing the amount of cooling air required to meet the airfoil life goal. The present invention increases internal surface roughness of turbine airfoil castings through the use of EDM.

An electrode in the shape of the entire internal core cavity or proportions thereof can be utilized to effect the internal surface roughness. The specifically shaped electrode is then used to machine the inside of the core cavity creating a roughened surface.

DETAILED DESCRIPTION OF THE INVENTION

Figure 1:
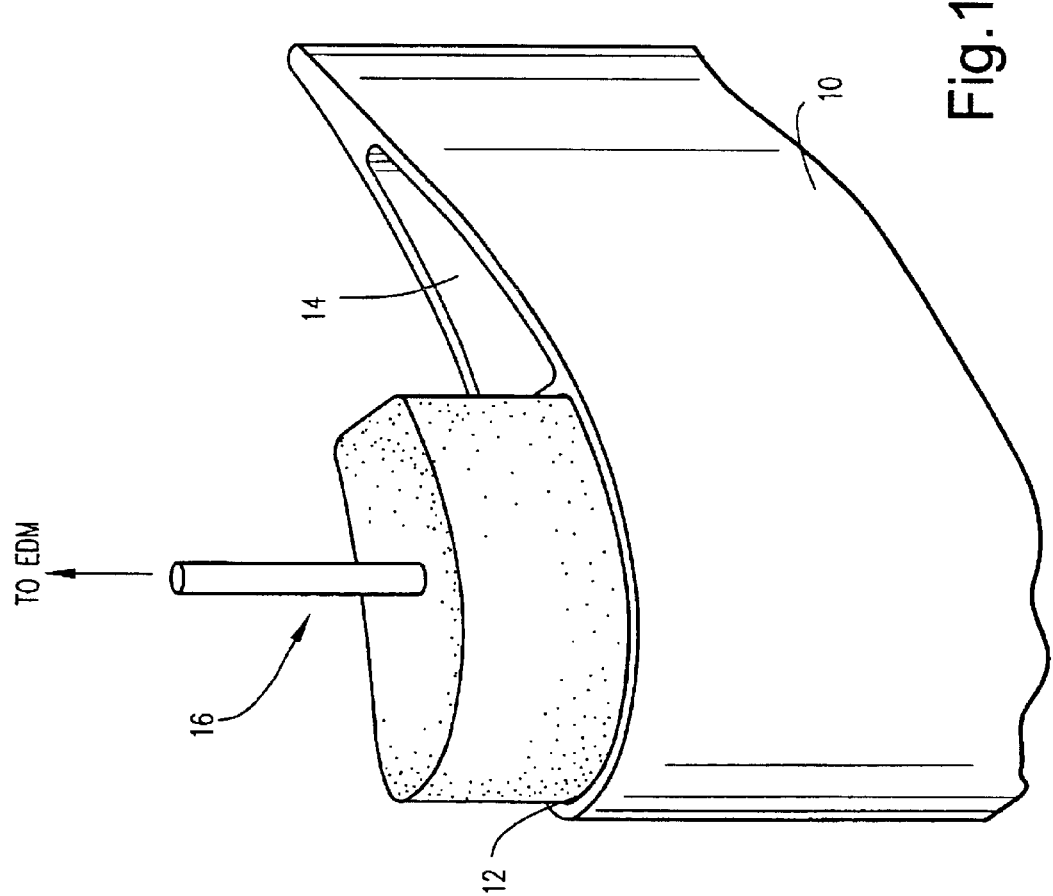
FIG. 1 shows a graphite electrode in accordance with one embodiment of the present invention used in the core cavity of an airfoil.

As shown in FIG. 1, an airfoil 10 has core cavities 12 and 14 formed therein. A graphite electrode assembly 16, a well known component of an electrical discharge machine, is fitted to cavity 12 for roughening the surface therein. The graphite electrode 16 is machined to fit within the cavity 12 from at least one opening in the airfoil 10. The machining of the graphite electrode 16 takes into consideration the physical dimensions and shape of the cavity 12, such as, for example, the tapering of side walls, etc.

Figure 2:
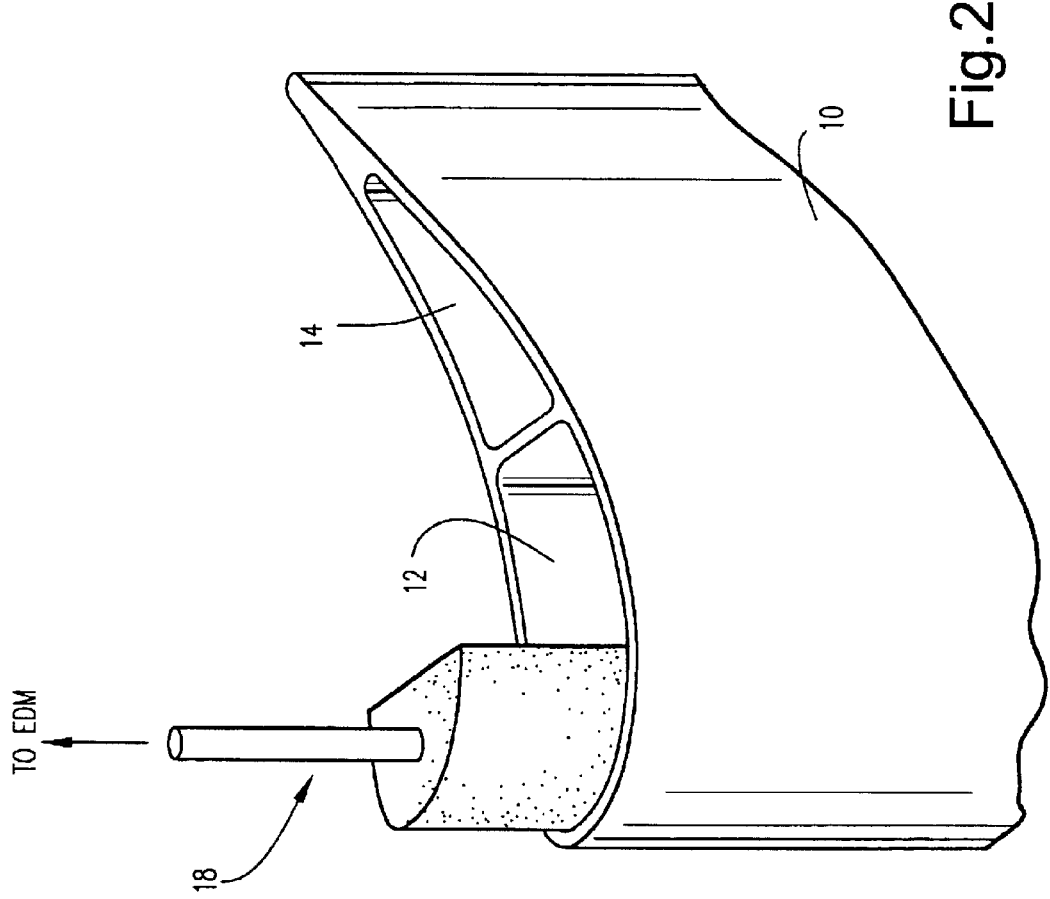
FIG. 2 shows a partial graphite electrode in accordance with the second embodiment of the invention used in a core cavity of an airfoil.

FIG. 2 shows a partial graphite electrode assembly 18 which is fitted to a portion of cavity 12 of airfoil 10 for roughening the surface therein. Because the leading edge of the airfoil 10 runs hottest, the partial graphite electrode 18 has been shaped to roughen the internal surface of the cavity 12 in the proximity of the leading edge of airfoil 10. The partial graphite electrode 18 provides more ease and flexibility in machining cavities having complex and involved physical dimensions, such as, for example multi-tapered side walls of various dimensions.

Figure 3:
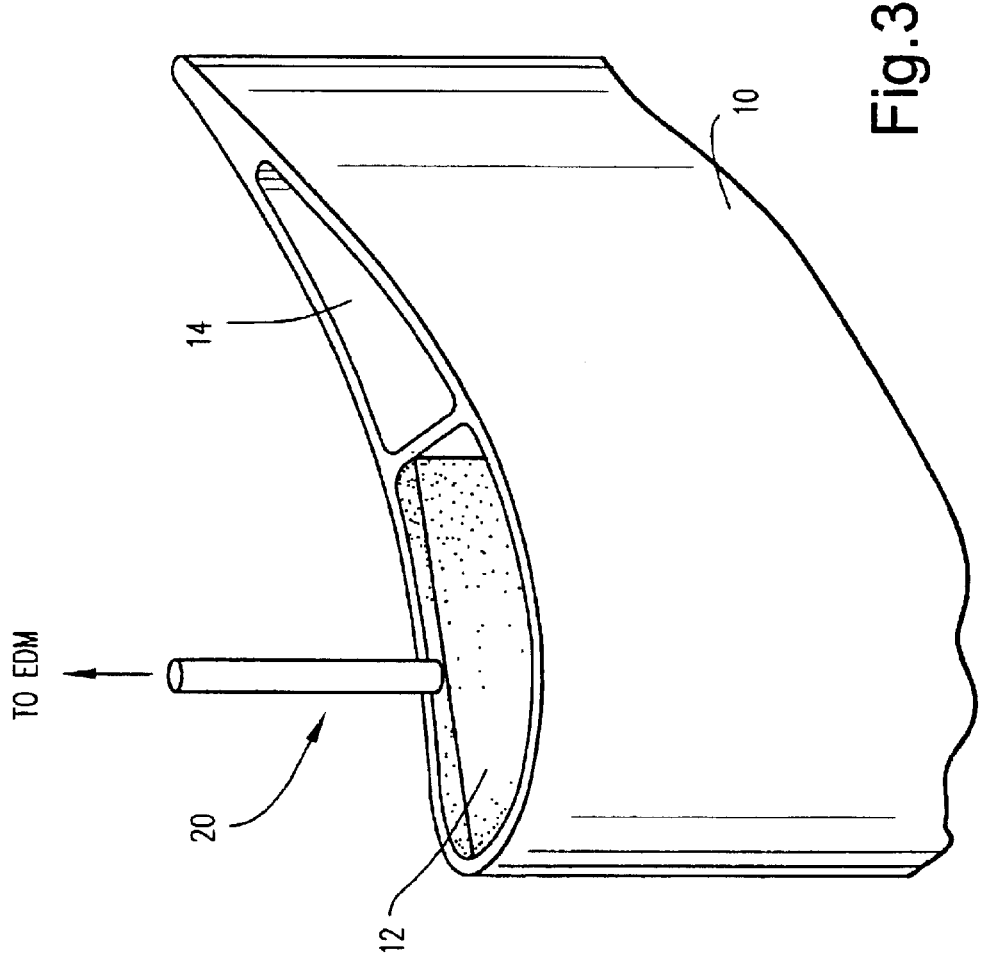
FIG. 3 shows an electrode disposed within an airfoil shaped to machine the suction side of the airfoil.

FIG. 3 shows a partial graphite electrode assembly 20 shaped for roughening the internal surface of cavity 12 along the suction side of airfoil 10. As will be appreciated by those skilled in the art, the graphite electrode assembly can be machined and shaped to roughen any particular portion of an airfoil internal cavity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the specific embodiments of the invention detailed herein related to airfoil cavities, but other castings or components, i.e., shrouds, nozzles, etc., that require increased cooling are also amenable to this invention.

What is claimed is:

1. A method for increasing coolant side surface roughness, comprising the steps of:
    forming an electrical discharge machining electrode to fit into an internal core cavity of a casting;
    connecting said electrode to an electrical discharge machine; and
    machining the internal sides of said internal core cavity with said electrical discharge machining electrode to form a roughened surface.

2. A method as claimed in claim 1, wherein in said forming step the electrode is formed to fit completely in said internal cavity.

3. A method as claimed in claim 1, wherein in said forming step the electrode is formed to fit into a portion of said internal cavity.

4. A method as claimed in claim 1, wherein said electrode is formed fit into said casting from more than one opening into said casting.

5. A method as claimed in claim 1, said casting comprising an airfoil.

6. A method as claimed in claim 1, said casting comprising a shroud.

7. A method as claimed in claim 1, said casting comprising a nozzle.

* * * * *